United States Patent
Bunimovich et al.

(10) Patent No.: US 6,199,024 B1
(45) Date of Patent: Mar. 6, 2001

(54) CALIBRATION PROCESS FOR SHAPE MEASUREMENT

(75) Inventors: David Bunimovich, Netanya; Gabi Horovitz, Misgav, both of (IL)

(73) Assignee: Nextel Ltd., Haifa (IL)

( * ) Notice: Subject to any disclaimer, the term of this patent is extended or adjusted under 35 U.S.C. 154(b) by 0 days.

(21) Appl. No.: 09/391,611

(22) Filed: Sep. 7, 1999

(51) Int. Cl.[7] .................................................. G06F 19/00
(52) U.S. Cl. .................................................. 702/95; 33/561
(58) Field of Search .............................. 702/95, 152, 153, 702/168; 33/561

(56) References Cited

U.S. PATENT DOCUMENTS

| | | | | |
|---|---|---|---|---|
| 4,819,195 | * | 4/1989 | Bell et al. | 364/571.05 |
| 4,945,501 | * | 7/1990 | Bell et al. | 364/571.05 |
| 5,177,563 | * | 1/1993 | Everett et al. | 356/375 |
| 5,594,668 | * | 1/1997 | Bernhardt et al. | 364/571.07 |
| 5,610,846 | * | 3/1997 | Trapet et al. | 364/571.01 |
| 5,657,549 | * | 8/1997 | Shen et al. | 33/503 |
| 5,687,293 | * | 11/1997 | Snell | 395/89 |
| 5,920,394 | * | 7/1999 | Gelbart et al. | 356/375 |
| 6,069,700 | * | 5/2000 | Rudnick et al. | 356/359 |
| 6,112,423 | * | 9/2000 | Sheehan | 33/502 |

OTHER PUBLICATIONS

"WIZprobe" brochure, NEXTEC Ltd. Corporation, date unknown.*

* cited by examiner

*Primary Examiner*—Patrick Assouad
(74) *Attorney, Agent, or Firm*—Mark M. Friedman

(57) ABSTRACT

A calibration method for a shape measurement with a variable distance between the scanning probe datum point and the measuring point on the surface of a workpiece, is provided. Based on the measured distance between the scanning probe datum point and each of a plurality of measuring points on the surface of a calibration object, and on the position of a reference point on a motion system platform on which the scanning probe assembly is mounted, corresponding to the scanning probe being in a sensing position of each of the plurality of measuring points, the method provides the necessary data for calculating the coordinate of a measuring point of the workpiece from the measured distance between the scanning probe datum point and the measuring point, and from the position of the reference point corresponding to the to the scanning probe being in a sensing position of the measuring point.

14 Claims, 4 Drawing Sheets

CALIBRATION PROCESS FOR SHAPE MEASUREMENT

FIELD AND BACKGROUND OF THE INVENTION

The present invention relates to measurement of the shape of a workpiece and, more particularly, to a method for calibrating a shape measuring system with a variable distance between the scanning probe and the measuring point of the workpiece.

A layout of a typical shape measuring system, such as a coordinate measuring machine (CMM), is illustrated in FIG. 1. A workpiece 10 with a measuring point 11 on the surface of workpiece 10, is set on a working table 21 of a shape measuring system 20. A scanning probe 41 senses measuring point 11, by either touching measuring point 11 in a contact shape measurement, or by pointing toward measuring point 11 and measuring a distance D between measuring point 11 and a scanning probe datum point 43 in a non-contact shape measurement. A scanning probe holder 42 (usually a probe head), as part of a scanning probe assembly 40, holds scanning probe 41 onto a motion system platform 30. Motion system platform 30 is movable in three axes (X, Y, Z) of a fixed coordinate frame 22 of shape measuring system 20. The motion and position of motion system platform 30 are monitored according to the coordinates of a reference point 31 on motion system platform 30. A vector $\vec{r}_{CMM}$, with Cartesian components ($X_{CMM}$, $Y_{CMM}$, $Z_{CMM}$) in coordinate frame 22, represents the position of reference point 31 relative to a fixed origin point 23 of coordinate frame 22, whereas a vector $\vec{r}$, with Cartesian components (X, Y, Z) in coordinate frame 22, represents the coordinate of measuring point 11 relative to origin point 23. The coordinate $\vec{r}_{CMM}$ of reference point 31, is read whenever the scanning probe senses a measuring point on the surface of the workpiece.

However, because of a spatial offset between reference point 31 and measuring point 11, the coordinate $\vec{r}$ of measuring point 11 is displaced relative to the measured position $\vec{r}_{CMM}$ of reference point 31, according to the formula: $\vec{r} = \vec{r}_{CMM} + \vec{\delta}$, where a displacement vector $\vec{\delta} = \vec{\Delta} + \vec{D}$ is composed of two components: a vector $\vec{\Delta}$, with Cartesian components ($\Delta_X$, $\Delta_Y$, $\Delta_Z$) in coordinate frame 22, which is a constant offset between scanning probe datum point 43 and reference point 31, and $\vec{D} = D \cdot \vec{i}$, which is a distance vector between measuring point 11 and scanning probe datum point 43, where $\vec{i}$ is a unit vector pointing from the scanning probe datum point 43 toward the measuring point.

It is worthwhile to mention, that in the case of present art contact scanning probes, the distance D between the scanning probe datum point and the measuring points of the workpiece is constant. It is then common to define the scanning probe datum point as the touching point of the scanning probe with the surface of the workpiece. In such a case, D=0, and hence $\vec{\delta} = \vec{\Delta}$.

Thus, in the case of shape measurement using either a present art contact scanning probe, or a non-contact scanning probe with a constant distance D between the scanning probe datum point and the measuring points of the workpiece, if all points of the workpiece are measured with the same scanning probe configuration, then the displacement $\vec{\delta}$ between reference point 31 and measuring point 11 is the same for all measuring points of the workpiece. Hence, measuring the coordinate $\vec{r}_{CMM}$ of reference point 31 is sufficient in this case for determining the shape of the workpiece.

The situation is more complicated when several different scanning probe configurations are used for measuring the same workpiece, using either a present art contact scanning probe, or a non-contact scanning probe with a constant distance D between the scanning probe datum point and the measuring points of the workpiece. The various scanning probe configurations can differ by the offset $\vec{\Delta}$ between the scanning probe datum point 43 and the reference point 31, and/or the distance D between the scanning probe datum point 43 and the measuring point 11, and/or the inclination of the scanning probe. An example of changing the scanning probe configuration, is by attaching an extension, such as a metal shaft, to a contact scanning probe to make it longer, when necessary for measuring hard-to-reach parts of the workpiece.

Thus, in such cases where several different scanning probe configurations are used for measuring the same workpiece, the displacement $\vec{\delta}$ between reference point 31 and measuring point 11, is not the same for all measuring points of the workpiece. Hence, measuring the coordinate $\vec{r}_{CMM}$ of reference point 31 is not sufficient in this case for determining the shape of the workpiece. Thus, appropriate prior art calibration methods exist, which provide the data that is necessary for deriving the coordinate $\vec{r}$ measuring point 11 from the measured position coordinate $\vec{r}_{CMM}$ of reference point 31.

The basic idea of these prior art calibration methods which are suitable for shape measurement using either a present art contact scanning probe, or a non-contact scanning probe with a constant distance D between the scanning probe datum point and the measuring points of the workpiece, is to utilize a calibration object with a known geometry and a particular calibration point.

A vector diagram of a setup of a shape measuring system for a prior art calibration process is shown in FIG. 2. A calibration object 50 with a known geometry, and including a calibration point 55, is fixed by a fixture 59 to working table 21 of shape measuring system 20. Calibration object 50 is usually a calibration sphere with a known radius R, and the center point of the calibration sphere serving as calibration point 55.

For each scanning probe configuration individually, several measuring points on the circumference of calibration sphere 50 are scanned, and the corresponding position $\vec{r}_{CMM}$ of the reference point on the motion system platform for each measuring point on the calibration sphere, is recorded.

For the sake of describing the prior art calibration methods, a measuring point 51" indicates a measuring point "n" out of a plurality of N+1 measuring points numbered "0", "1", "2", ..., "N" on the circumference of calibration sphere 50, for the calibration process of a particular scanning probe configuration. Point 31" in FIG. 2 indicates the corresponding position of reference point 31 of FIG. 1 when scanning probe 41 senses measuring point 51".

Referring further to FIG. 2, vector equations between the various positions and distances can be written for each of the plurality of N+1 measuring points. However, for the sake of simplicity, these equations will be explicitly presented for measuring point "n" (51"), as a representative for all N+1 measuring points.

The basic relation is: $\vec{r}(n) = \vec{r}_{CMM}(n) + \vec{\delta}$, where a position vector $\vec{r}_{CMM}(n)$, with Cartesian components ($X_{CMM}(n)$, $Y_{CMM}(n)$, $Z_{CMM}(n)$) in coordinate frame 22, represents the measured position of reference point 31" relative to an origin point 23 of coordinate frame 22. $\vec{\delta}$ is the constant but unknown displacement vector between measuring point 51" and reference point 31", with Cartesian components ($\delta_X$, $\delta_Y$, $\delta_Z$) in coordinate frame 22. Thus, the coordinate vector $\vec{r}(n)$, with Cartesian components ($X(n)$, $Y(n)$, $Z(n)$) in coordinate frame 22, representing the coordinates of measuring point 51" relative to an origin point 23 of coordinate frame 22, can be calculated from the measured position vector $\vec{r}_{CMM}(n)$ of reference point 31" when knowing the displacement vector $\vec{\delta}$.

In order to provide the data that is needed for calculating the coordinate of a measuring point from the corresponding position of the reference point, the geometrical relation: $|\vec{r}(n) - \vec{r}_C|^2 = R^2$ is utilized in the prior art calibration methods for each of the plurality of N+1 measuring points on the circumference of calibration sphere 50, where the coordinate vector $\vec{r}_C$, with Cartesian components ($X_C$, $Y_C$, $Z_C$) in coordinate frame 22, represents the constant but unknown coordinates of calibration sphere's center point 55 relative to origin point 23 of coordinate frame 22. Inserting the relation for $\vec{r}(n)$: $\vec{r}(n) = \vec{r}_{CMM}(n) + \vec{\delta}$, the geometrical relation $|\vec{r}(n) - \vec{r}_C|^2 = R^2$, reads: $|\vec{r}_{CMM}(n) - (\vec{r}_C)_{CMM}|^2 = R^2$; where the coordinate vector $(\vec{r}_C)_{CMM} = \vec{r}_C - \vec{\delta}$, represents the effective position of reference point 31 that would have been obtained if scanning probe 41 would have been sensing calibration sphere's center point 55 directly. The Cartesian components $((X_C)_{CMM}, (Y_C)_{CMM}, (Z_C)_{CMM})$ of coordinate vector $(\vec{r}_C)_{CMM}$ in coordinate frame 22, are: $(X_C)_{CMM} = X_C - \delta_X$, $(Y_C)_{CMM} = Y_C - \delta_Y$, and $(Z_C)_{CMM} = Z_C - \delta_Z$.

Thus, in order to derive the value of the coordinate vector $(\vec{r}_C)_{CMM}$ for each scanning probe configuration, from the measured coordinate vectors $\vec{r}_{CMM}(n)$ for all N+1 measuring points over the circumference of calibration sphere 50, a best fit is performed using a chi-square merit function, $\chi^2((\vec{r}_C)_{CMM})$, that incorporates the geometrical relation $|\vec{r}(n) - \vec{r}_C|^2 = R^2$ for the whole set of N+1 measuring points:

$$\chi^2((\vec{r}_C)_{CMM}) = \sum_{n=0}^{N}\left[|(\vec{r}(n) - \vec{r}_C)|^2 - R^2\right]^2$$

$$= \sum_{n=0}^{N}\left[|\vec{r}_{CMM}(n) - (\vec{r}_C)_{CMM}|^2 - R^2\right]^2$$

There are well known non-linear least squares methods, such as Levenberg-Marquardt method, for performing this best fit. These methods are described in a variety of text books, such as for example, "Numerical Recipes in C", W. H. Press et al, 2nd Edition, Cambridge University Press, 1992.

The next steps in the prior art calibration methods are as follows. One of the scanning probe configurations is defined as a master scanning probe configuration. Then, the data that is needed for transforming the position of the reference point obtained by scanning the surface of the workpiece with the various probe configurations, to one common basis, is derived. This common basis is the position of the reference point that would have been obtained by scanning the surface of the workpiece by the master scanning probe configuration.

This transformation into a reading of the reference point position that would have been obtained by scanning with the master scanning probe configuration, is based on the following considerations. If $\vec{r}$ is the coordinate of a measuring point on the surface of the workpiece, then the corresponding position $\vec{r}_{CMM}$ of the reference point on the motion system platform when scanning with a particular scanning probe configuration, is: $\vec{r}_{CMM} = \vec{r} - \vec{\delta}$, and the relation between the same coordinate $\vec{r}$ and the position of the reference point $\vec{r}_{CMM}(M)$ that would have been obtained with the master scanning configuration, is: $\vec{r}_{CMM}(M) = \vec{r} - \vec{\delta}(M)$, where $\vec{\delta}$ and $\vec{\delta}(M)$ are the displacement between the reference point position and the measuring point, for the particular scanning probe configuration and the master probe configuration, respectively. Thus, the transformation from $\vec{r}_{CMM}$ into $\vec{r}_{CMM}(M)$ is given by: $\vec{r}_{CMM}(M) = \vec{r}_{CMM} + \vec{\delta} - \vec{\delta}(M)$, where the difference $\vec{\delta} - \vec{\delta}(M)$ can be determined according to the difference between the center of the calibration sphere $(\vec{r}_C)_{CMM}$ as obtained for the particular scanning probe configuration, and the center of the calibration sphere $(\vec{r}_C)_{CMM}(M)$ as obtained for the master scanning probe configuration, namely: $\vec{\delta} - \vec{\delta}(M) = (\vec{r}_C)_{CMM}(M) - (\vec{r}_C)_{CMM}$.

The situation gets even more complicated when the surface of the workpiece is scanned using a scanning probe with a variable distance D between the scanning probe datum point and the measuring point of the workpiece. An example of such a scanning probe, is a non-contact scanning probe, such as the laser-based WIZ probe, manufactured by Nextec of Tirat Hacarmel, Israel. The WIZ probe is suitable for measuring with a high resolution of 0.1 μm, a variable distance D between the scanning probe datum point and a measuring point on the surface of the workpiece, with a nominal value of the distance D of 50 mm, and a non-zero dynamic range of ±5 mm.

In such a scanning with a variable distance D, the displacement $\vec{\delta} = \vec{\Delta} + \vec{D}$ between the reference point and the measuring point of the workpiece, varies through the scanning of the workpiece. Thus, the above mentioned prior art calibration methods that are based on deriving the difference between a constant offset $\vec{\delta}$ and the constant offset $\vec{\delta}(M)$ of a master scanning probe configuration, by determining the coordinates of a calibration point, such as a center of a calibration sphere, are not suitable for scanning with a variable distance D.

There is thus a widely recognized need for, and it would be highly advantageous to have, a calibration method for shape measurement with a variable distance D between the scanning probe datum point and the measuring point of the workpiece, for providing the data that is needed for deriving the coordinate $\vec{r}$ of a measuring point of the workpiece from the measured corresponding position $\vec{r}_{CMM}$ of the reference point on the motion system platform, and the measured distance D between the scanning probe datum point and the measuring point of the workpiece, in an accurate and straightforward manner.

SUMMARY OF THE INVENTION

According to the present invention there is provided, in a shape measuring system for measuring a shape of a workpiece, the shape measuring system having a fixed coordinate frame with a fixed origin point, a method for calibrating a configuration of a scanning probe having a variable distance to the workpiece, the scanning probe being held by a scanning probe holder, the method comprising the steps of: (a) providing a calibration object to serve as the workpiece, said calibration object including a calibration point; (b) for each of a first plurality of points on a surface of said calibration object: (i) measuring a distance from said each point to the scanning probe; and (ii) measuring a position of a reference point, when the scanning probe is in a scanning position of said each point, thereby providing a first set of measured calibration data; and (c) performing a first simultaneous fitting of both an inclination of the scanning probe and a position of said calibration point to said first set of measured calibration data, thereby providing a first set of inferred calibration data.

According to the present invention there is provided, in a shape measuring system for measuring a shape of a workpiece, a method for calibrating a plurality of configurations of at least one scanning probe having a variable distance to the workpiece, each at least one scanning probe having an offset from a reference point in each respective configuration thereof, the method comprising the steps of: (a) providing a calibration object including a calibration point; (b) calibrating each configuration separately, to provide a set of inferred calibration data for said each configuration including an inclination of a respective scanning probe of said each configuration and a position of said calibration point; (c) designating one of the plurality of configurations as a master configuration; and (d) calculating, for each configuration other than said master configuration, a difference between said offset of said respective scanning probe of said each configuration other than said master configuration, and said offset of said respective scanning probe of said master configuration.

According to the present invention there is provided a method for measuring a shape of a workpiece using a configuration of a scanning probe having a variable distance to the workpiece, the method comprising the steps of: (a) providing a calibration object including a calibration point; (b) calibrating the configuration to provide a set of inferred calibration data including an inclination of the scanning probe and a position of said calibration point; (c) for each of a plurality of points on a surface of the workpiece: (i) measuring a distance from said each point to the scanning probe; and (ii) measuring a position of a reference point, when the scanning probe is in a scanning position of said each point, thereby providing a set of measured data for said each point; (d) calculating coordinates for each of said plurality of points, using said set of measured data for said each point and said set of inferred calibration data; and (e) determining the shape of the workpiece, using said coordinates of said plurality of points.

According to the present invention there is provided a method for measuring a shape of a workpiece using at least one of a plurality of configurations of at least one scanning probe having a variable distance to the workpiece, each at least one scanning probe having an offset from a reference point in each respective configuration thereof, the method comprising the steps of: (a) providing a calibration object including a calibration point; (b) calibrating each configuration separately, to provide a set of inferred calibration data for said each configuration including an inclination of a respective scanning probe of said each configuration and a position of said calibration point; (c) designating one of the plurality of configurations as a master configuration; (d) calculating, for each of the configurations other than said master configuration, a difference between said offset of said respective scanning probe of said each configuration other than said master configuration, and said offset of said respective scanning probe of said master configuration, thereby providing an offset difference for said each configuration other than said master configuration; (e) for each of a plurality of points on a surface of the workpiece, scanning said each point using a respective one of said at least one scanning probe in a respective configuration thereof, thereby measuring, for said each point: (i) a distance from said each point to said respective scanning probe; and (ii) a position of the reference point, when said respective scanning probe is in a scanning position of said each point, thereby providing a set of measured data for said each point; (f) calculating coordinates for each of said plurality of points, using both said set of measured data for said each point, and said set of inferred calibration data for said respective configuration of said each point, said calculating also using said offset difference of said respective configuration of said each point, if said respective configuration of said each point is a configuration other than said master configuration; and (g) determining the shape of the workpiece, using said coordinates of said plurality of points.

The calibration process according to the present invention provides the data, for each applicable scanning probe configuration, that is necessary for deriving the coordinate of a measuring point on the surface of the workpiece, from the position of the reference point on the motion system platform on which the scanning probe assembly is mounted, and the measured distance between a scanning probe datum point and the measuring point on the surface of the workpiece. The position of the reference point is preferably expressed relative to a fixed origin point of a fixed coordinate frame of the shape measuring system.

In order to provide the data that is necessary for calculating the coordinate of the measuring point of the workpiece, a plurality of measuring points on the surface of a calibration object, is used. The calibration object with a known geometry and a particular calibration point, is preferably, but is not limited to, a calibration sphere with a known radius R, with the center point of the calibration sphere serving as the calibration point.

However, because of the variable distance D between the scanning probe datum point and the measuring point, the calibration process according to the present invention is more complicated than the prior art calibration methods which are suitable for a fixed distance D only. Thus, the data on the inclination of the scanning probe is inferred in the calibration process of the present invention, in addition to inferring the data on the coordinate of the calibration point which was sufficient in the prior art calibration methods. The inclination of the scanning probe is preferably expressed in polar coordinates relative to the fixed coordinate frame of the shape measuring system.

Furthermore, in order to obtain more accurate results, especially on the inclination of the scanning probe, an adequate distribution of the measuring points on the surface of the calibration object is important. Therefore, the data measuring process and the best fit process for inferring the data on the inclination of the scanning probe and on the coordinates of the calibration point, are preferably performed in the following stepwise manner.

In the first step, the data measuring and the best fit processes are performed over a primary set of measuring points on the surface of the calibration object. The data inferred in the first step, on the inclination of the scanning probe and on the coordinate of the calibration point, is used for determining the adequate distribution on the surface of the calibration object of the measuring points for the next step, and as a first estimation for the data to be inferred in the best fit process of the second step. Concerning the inclination of the scanning probe, a recorded value of the inclination of a scanning probe holder that holds the scanning probe in the required inclination, can be used as a first estimation on the inclination of the canning probe for the best fit processes.

The present invention successfully addresses the shortcomings of the presently known configurations by providing a calibration process for shape measurement, that provides in an accurate and straightforward manner, the necessary data for calculating the coordinate of a measuring point on the surface of a workpiece, in the case of a variable distance between the scanning probe datum point and the measuring point.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
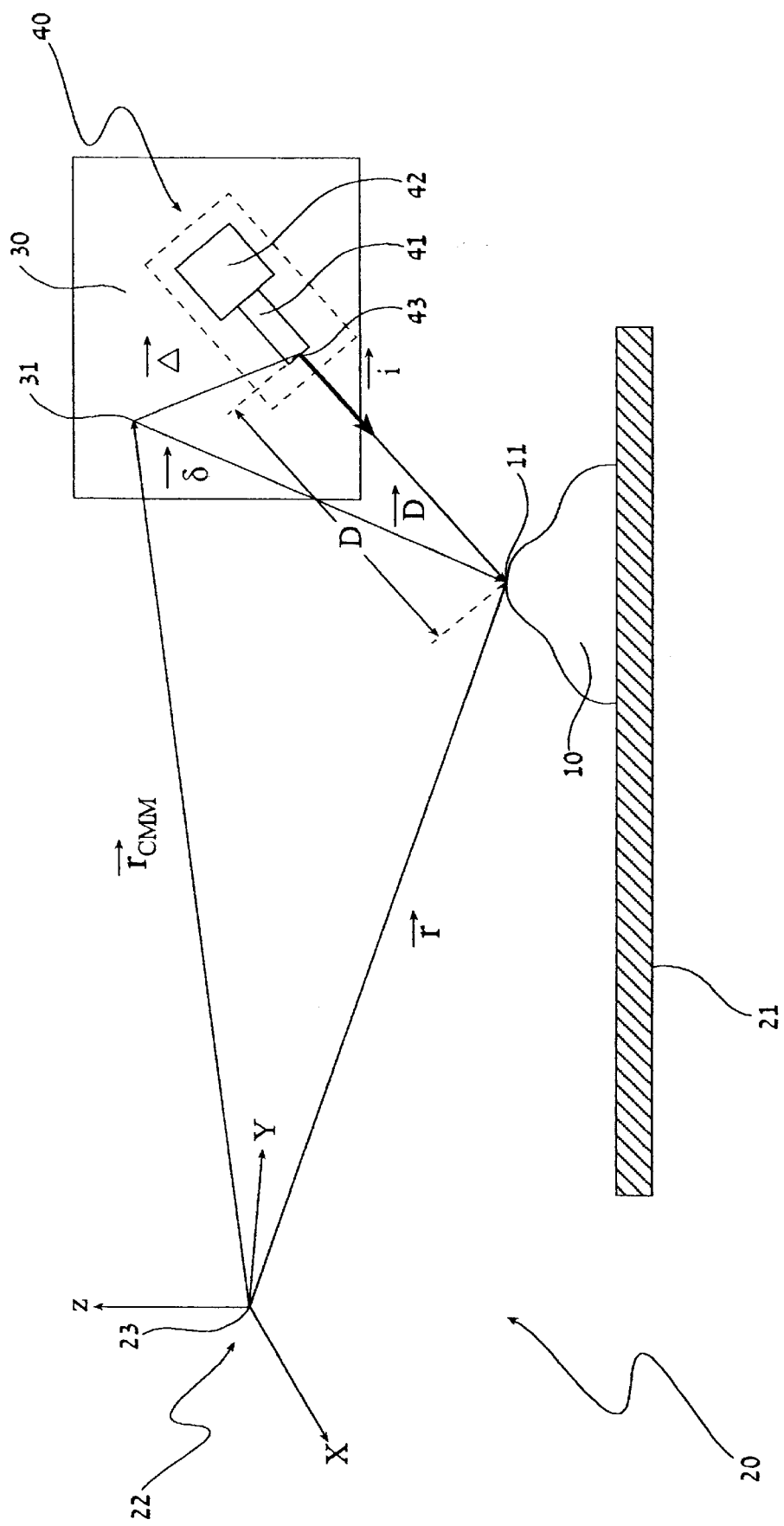
FIG. 1 illustrates a typical configuration of a shape measuring system.

The present invention is of a method for calibrating a shape measurement with a variable distance between the scanning probe and the measuring point of a workpiece. Specifically, the present invention can be used to provide the data that is necessary for deriving the coordinate of a measuring point on the surface of the workpiece, from the position of a reference point on a motion system platform on which the scanning probe assembly is mounted, and the measured distance between a scanning probe datum point and the measuring point on the surface of the workpiece.

The principles and operation of a calibration process for shape measurement according to the present invention may be better understood with reference to the drawings and the accompanying description.

Before explaining the present invention in detail, it should be explained that the present invention is not limited in its application to the details of construction and the arrangement of the components set forth in the following description or illustrated in the drawings. The present invention is capable of other embodiments or of being practiced or carried out in various ways. Also, it is to be understood that the phraseology and terminology employed herein is for the purpose of description and should not be regarded as limiting.

Referring now to the drawings, FIG. 1, which was already referenced to in the "Field and Background of the Invention" section, illustrates a typical configuration of a shape measuring system 20, such as a coordinate measuring machine (CMM).

Generally speaking, the coordinate $\vec{r}$ of measuring point 11 is displaced relative to the measured position $\vec{r}_{CMM}$ of reference point 31, according to the formula: $\vec{r} = \vec{r}_{CMM} + \vec{\delta}$, where a displacement vector $\vec{\delta} = \vec{\Delta} + \vec{D}$ is a sum of an offset vector $\vec{\Delta}$ between scanning probe datum point 43 and reference point 31, and a distance vector $\vec{D} = D \cdot \vec{i}$ between measuring point 11 and scanning probe datum point 43, where $\vec{i}$ is a unit vector pointing from the scanning probe datum point 43 toward the measuring point. Hence, in a shape measurement with a variable distance D between measuring point 11 and scanning probe datum point 43, the displacement vector $\vec{\delta}$ between measuring point 11 and reference point 31 varies through the scanning of the workpiece, even in a case that the whole workpiece is scanned with the same scanning probe configuration, namely scanning the whole workpiece with a constant offset vector $\vec{\Delta}$ between scanning probe datum point 43 and reference point 31, and a constant inclination of scanning probe 41.

Thus, for shape measurement with a variable distance D, even in the case of scanning the whole workpiece 10 with the same scanning probe configuration, an appropriate calibration process is required, based on the relation $\vec{r} = \vec{r}_{CMM} + \vec{\delta}$, for deriving the coordinate vector $\vec{r}$ of measuring point 11 from the measured corresponding position vector $\vec{r}_{CMM}$ of reference point 31, and the measured distance D between scanning probe datum point 43 and measuring point 11. Hence, because $\vec{\delta} = \vec{\Delta} + \vec{D}$, such a calibration process should provide the data on the inclination of scanning probe 41, needed for determining the distance vector $\vec{D}$.

Figure 3:
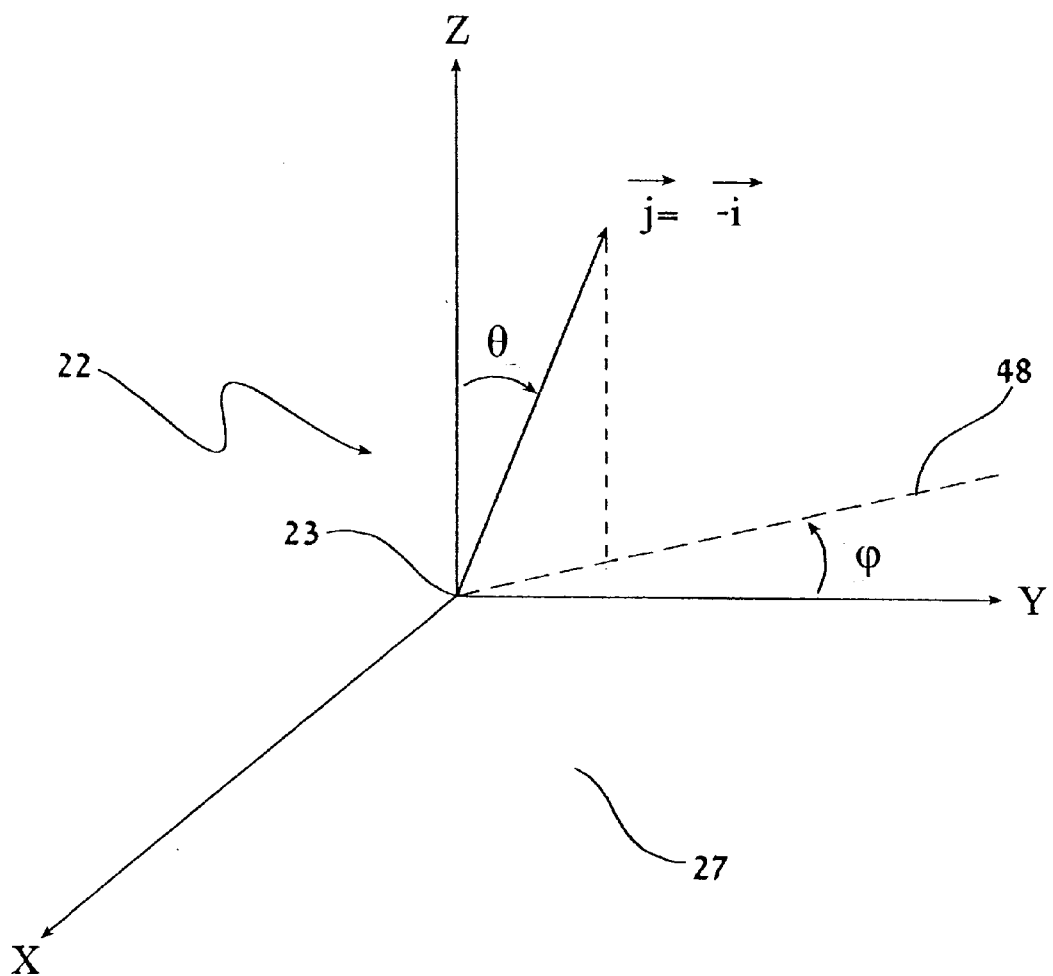
FIG. 3 represents the inclination of a scanning probe in polar coordinates.

Concerning the inclination of scanning probe 41, it is preferable, but is not obligatory, to use the convention shown in FIG. 3. Namely, to express the inclination of scanning probe 41 of FIG. 1 by the polar coordinates $\theta$ and $\phi$ of a unit vector $\vec{j}$ pointing in an opposite direction to unit vector $\vec{i}$ of FIG. 1, i.e. $\vec{j} = -\vec{i}$. A pitch angle $\theta$ in FIG. 3, is the angle between polar axis Z of coordinate frame 22 and unit vector $\vec{j}$; whereas a yaw angle $\phi$, is the angle between axis Y of coordinate frame 22 and a projection 48 of unit vector $\vec{j}$ on XY plane 27 of coordinate frame 22. Hence, the Cartesian components $(D_X, D_Y, D_Z)$ of distance vector $\vec{D}$, in coordinate frame 22, are given by: $D_X = D \cdot i_X(\theta,\phi)$, $D_Y = D \cdot i_Y(\theta,\phi)$, and $D_Z = D \cdot i_Z(\theta,\phi)$, where the Cartesian components $(i_X(\theta,\phi), i_Y(\theta,\phi), i_Z(\theta,\phi))$ of unit vector $\vec{i}$, in coordinate frame 22, are given as function of the polar coordinates $(\theta,\phi)$ according to the formula: $i_X(\theta,\phi) = \sin\theta \sin\phi$, $i_Y(\theta,\phi) = -\sin\theta \cos\phi$ and $i_Z(\theta,\phi) = -\cos\theta$.

Furthermore, in a case of shape measurement with a variable distance D, where several different scanning probe configurations are used for measuring the same workpiece 10, in addition to providing the data on the inclination of scanning probe 41 for each scanning probe configuration, the calibration process should also provide the data on the difference $\vec{\Delta}-\vec{\Delta}(M)$ between the offset $\vec{\Delta}$ for each scanning probe configuration, and a fixed offset $\vec{\Delta}(M)$ of a master scanning probe configuration. By knowing the difference $\vec{\Delta}-\vec{\Delta}(M)$, the reading of position vector $\vec{r}_{CMM}$ of reference point 31 can be transformed into a reading of a position vector $\vec{r}_{CMM}(M)$ of reference point 31 that would have been obtained by scanning the workpiece with the master scanning probe configuration, namely: $\vec{r}_{CMM}(M) = \vec{r}_{CMM} + \vec{\Delta} - \vec{\Delta}(M)$. And then, by knowing the inclination of scanning probe 41, and distance D, the distance vector $\vec{D}$ can be derived, and the coordinate vector $\vec{r}(M)$ of measuring point 11 with respect to the master scanning probe configuration (up to an offset vector which is constant for all measuring points of workpiece 10, so that this constant offset vector has no influence on shape measurement of the workpiece), can be calculated according to the relation: $\vec{r}(M) = \vec{r}_{CMM}(M) + \vec{D}$.

The main purpose of the calibration process of the present invention is, therefore, to provide the data that is necessary for deriving the coordinates of measuring point 11 from the measured position of reference point 31, and the measured variable distance D between scanning probe datum point 43 and measuring point 11. Namely, to provide the data on the inclination of scanning probe 41, preferably expressed in polar coordinates $(\theta,\phi)$ as of FIG. 3; and, in the case that several different scanning probe configurations are used for measuring the same workpiece 10, to provide the data on offset vector $\vec{\Delta}$ that is necessary for transforming the measured position of reference point 31 into a value that would have been obtained by measuring the whole workpiece 10 with one and the same master scanning probe configuration.

Figure 2:
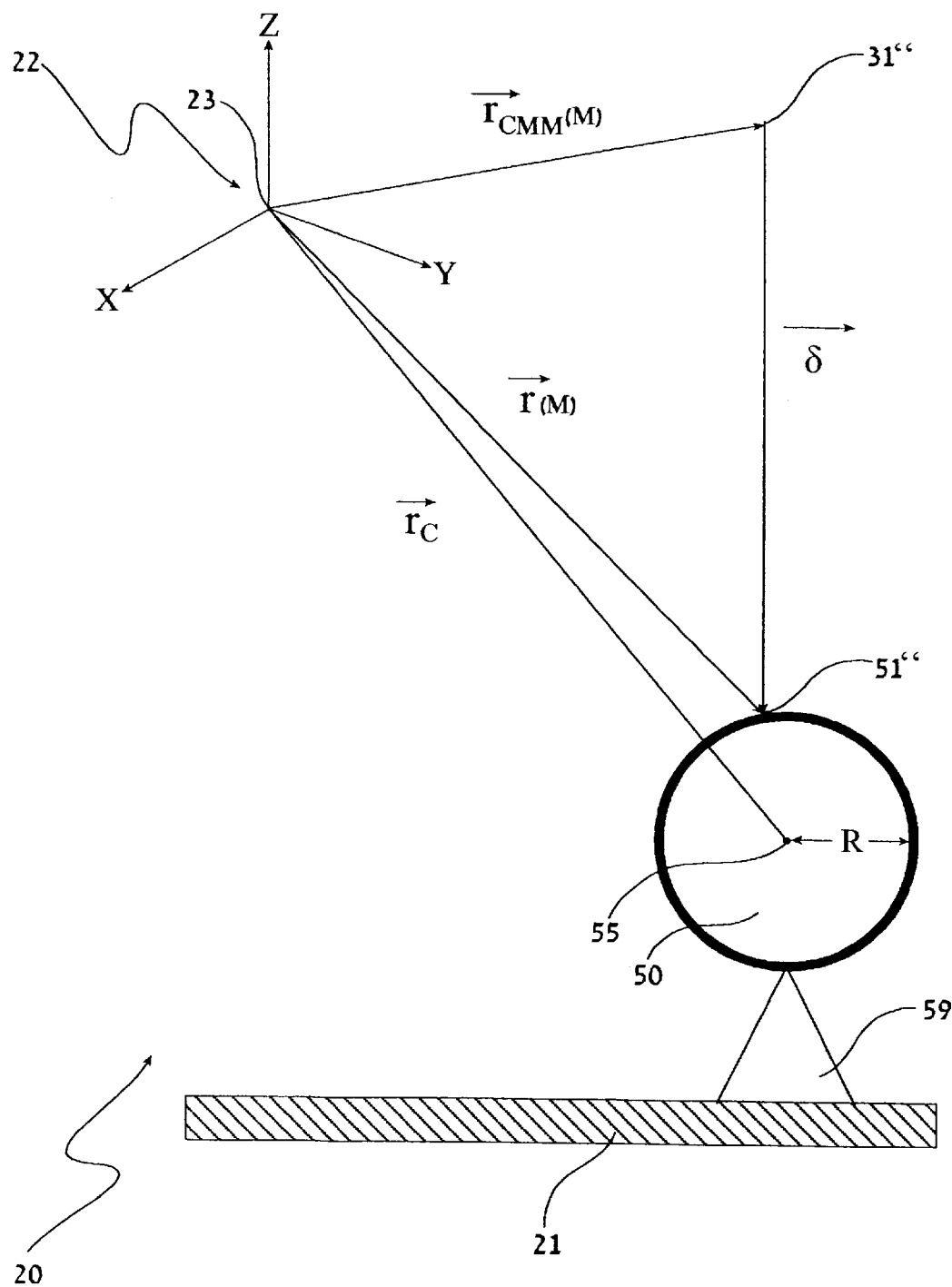
FIG. 2 is a vector diagram of a setup of a shape measuring system for a prior art calibration process.
Figure 4:
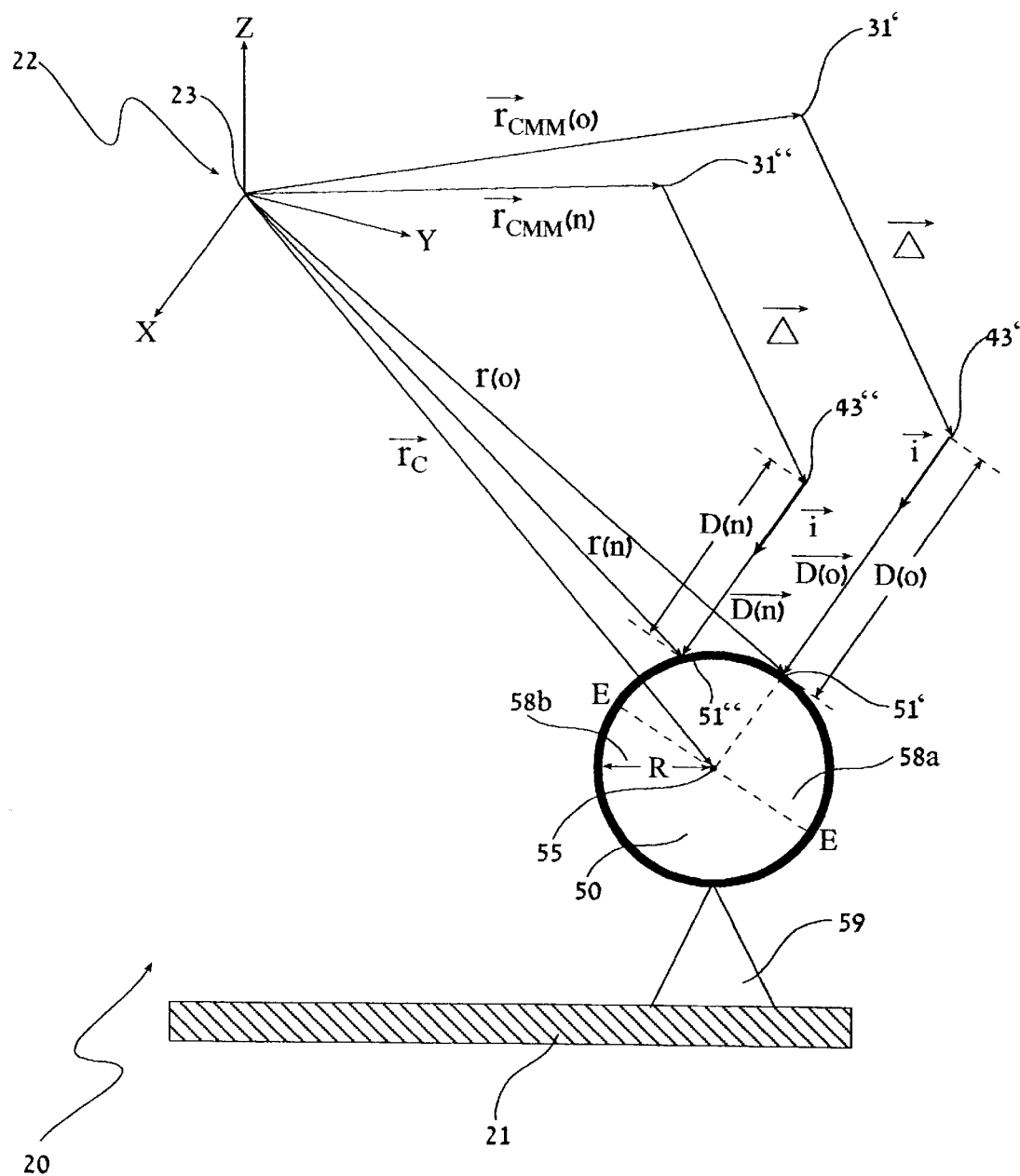
FIG. 4 is a vector diagram of a setup of a shape measuring system for a calibration process according to a preferred embodiment of the present invention.

A vector diagram of a setup of a shape measuring system for a calibration process according to a preferred embodiment of the present invention is shown in FIG. 4. Calibration object 50 with a known geometry, is fixed by fixture 59 to working table 21 of shape measuring system 20. Calibration object 50, similarly to the setup in FIG. 2 for a prior art calibration process, is preferably, but is not limited to, a calibration sphere with a known radius R, and the center point of the calibration sphere is serving as calibration point 55.

For the sake of describing the calibration process according to a preferred embodiment of the present invention, two measuring points, 51' and 51", are indicated on the circumference of calibration sphere 50. Measuring points 51' and 51" are considered as measuring point "O" and "n", respectively, out of a plurality of N+1 measuring points for the calibration process of a particular scanning probe configuration, where unit vector $\vec{i}$ points in the measurement direction of scanning probe 41 as depicted in FIG. 1, and offset vector $\vec{\Delta}$ represents the spatial offset between scanning probe datum point 43 and reference point 31 as depicted in FIG. 1. Points 31' and 43' in FIG. 4 indicate the position of reference point 31 and scanning probe 43, respectively, when scanning probe 41 senses measuring point 51' and a distance D(O) to measuring point 51' is measured; whereas points 31" and 43" in FIG. 4 indicate the position of reference point 31 and scanning probe 43, respectively, when scanning probe 41 senses measuring point 51" and a distance D(n) to measuring point 51" is measured. Measuring point 51' can be considered as a "north pole" of calibration sphere 50, with scanning probe 41 pointing at calibration sphere's center point 55 when sensing measuring point 51'. An "equator" EE is defined as a plane through calibration sphere's center point 55 that is perpendicular to the measuring direction of scanning probe 41. "Equator" EE divides calibration sphere 50 into two hemispheres: a "northern hemisphere" 58a, and a "southern hemisphere" 58b. For better and more accurate results of the calibration process, the N measuring points: "1", "2" "3", . . . , "N" which are represented by measuring point "n" 51", are evenly spaced as possible on the surface of "northern hemisphere" 58a of calibration sphere 50. It is worthwhile to mention, that the requirement for evenly spaced measuring points on the surface of "northern hemisphere" 58a of calibration sphere 50, is also recommended in the prior art calibration methods. However, because the prior art calibration methods are insensitive to the inclination of the scanning probe, this requirement is not so crucial in the prior art calibration methods as it is in the present invention.

Referring further to FIG. 4, vector equations between the various positions and distances can be written for each of the N+1 measuring points: "0", "1", "2", . . . , "N". However, for the sake of simplicity, these equations will be explicitly presented for measuring point "n" (51"), as a representative for all N+1 measuring points (including measuring point "O" (51')).

The basic relation is: $\vec{r}(n) = \vec{r}_{CMM}(n) + \vec{\Delta} + \vec{D}(n)$, where a vector $\vec{r}_{CMM}(n)$, with Cartesian components $(X_{CMM}(n), Y_{CMM}(n), Z_{CMM}(n))$ in coordinate frame 22, represents the measured position of reference point 31" relative to an origin point 23 of coordinate frame 22. A distance vector $\vec{D}(n)$, with Cartesian components $(D_X(n), D_Y(n), D_Z(n))$ in coordinate frame 22, can be derived from measured distance D(n) when knowing the polar coordinates $(\theta,\phi)$ of scanning probe 41 as of FIG. 3, according to the relation: $\vec{D}(n) = D(n) \cdot \vec{i}(\theta,\phi)$, which reads for the Cartesian components: $D_X(n) = D(n) \cdot i_X(\theta,\phi)$, $D_Y(n) = D(n) \cdot i_Y(\theta,\phi)$, and $D_Z(n) = D(n) \cdot i_Z(\theta,\phi)$, where $(i_X(\theta,\phi), i_Y(\theta,\phi), i_Z(\theta,\phi))$ are the Cartesian components of unit vector $\vec{i}(\theta,\phi)$ expressed as function of the polar coordinates $(\theta,\phi)$. Thus, a coordinate vector $\vec{r}(n)$, with Cartesian components $(X(n), Y(n), Z(n))$ in coordinate frame 22, representing the coordinates of measuring point 51" relative to origin point 23 of coordinate frame 22, can be calculated from the measured position vector $\vec{r}_{CMM}(n)$ of reference point 31" when knowing the offset vector $\vec{\Delta}$ and the distance vector $\vec{D}$.

In order to provide the data that is needed for calculating the coordinate of a measuring point from the corresponding position of the reference point, and the distance D between the scanning probe datum point and the measuring point, the geometrical relation: $|\vec{r}(n) - \vec{r}_c|^2 = R^2$ is utilized, as in the prior art calibration methods, for each of the plurality of N+1 measuring points on the circumference of calibration sphere 50, where the vector $\vec{r}_c$, with Cartesian components $(X_C, Y_C, Z_C)$ in coordinate frame 22, represents the constant but unknown coordinate of calibration sphere's center point 55 relative to origin point 23 of coordinate frame 22. Inserting the relation for $\vec{r}(n)$: $\vec{r}(n) = \vec{r}_{CMM}(n) + \vec{\Delta} + \vec{D}(n)$, the geometrical relation $|\vec{r}(n) - \vec{r}_c|^2 = R^2$, reads: $|\vec{r}_{CMM}(n) - ($ $\vec{r}_{C)CMM}+D(n)\cdot\vec{i}(\theta,\phi)|^2=R^2$; where a position vector ($\vec{r}_{C)CMM}=\vec{r}_C-\vec{\Delta}$, with Cartesian components (($X_C)_{CMM}$, $(Y_C)_{CMM}$, $(Z_C)_{CMM}$) in coordinate frame 22: $(X_C)_{CMM}=X_C-\Delta_X$, $(Y_C)_{CMM}=Y_C-\Delta_Y$, and $(Z_C)_{CMM}=Z_C-\Delta_Z$, represents the effective position of reference point 31 that would have been obtained if scanning probe 41 would have been sensing calibration sphere's center point 55 directly.

Thus, in order to derive the values of both the polar coordinates $(\theta,\phi)$ and the coordinate vector ($\vec{r}_{C)CMM}$, from the measured coordinate vectors $\vec{r}_{CMM}(n)$ and the measured distances $D(n)$ of all N+1 measuring points over the surface of "northern hemisphere" 58a of calibration sphere 50, a best fit is performed in a preferred embodiment of the present invention, using a chi-square merit function, $\chi^2(\theta,\phi,(\vec{r}_{C)CMM}))$, that incorporates the geometrical relation $|\vec{r}(n)-\vec{r}_C|^2=R^2$ for the whole set of N+1 measuring points:

$$\chi^2(\theta, \varphi, (\vec{r}_C)_{CMM}) = \sum_{n=0}^{N} \left[ |(\vec{r}(n) - \vec{r}_C)|^2 - R^2 \right]^2$$

$$= \sum_{n=0}^{N} \left[ |\vec{r}_{CMM}(n) - (\vec{r}_C)_{CMM} + D(n)\cdot\vec{i}(\theta, \varphi)|^2 - R^2 \right]^2$$

Furthermore, in order to achieve better and more accurate results, it is conceivable in a preferred embodiment of the present invention, to perform the best fit stepwise. It is preferred, but is not limited to, to perform the best fit in two steps. In the first step, scanning probe 41 is roughly set to point at the "north pole" 51" of calibration sphere 50, and the distance $D(n)$ and position vector $\vec{r}_{CMM}(n)$ of reference point 31" are measured for a primary set of measuring points 51" on the surface of "northern hemisphere" 58a of calibration sphere 50. The best fit in the first step, is made on three parameters which are the Cartesian components (($X_C)_{CMM}$, $(Y_C)_{CMM}$, $(Z_C)_{CMM}$) of position vector ($\vec{r}_C)_{CMM}$ of reference point 31 corresponding to the position of calibration sphere's center point 55, whereas the values of the polar coordinates $(\theta,\phi)$ of the inclination of scanning probe 41 are taken from the setting of probe holder 42 (these values are accurate enough as a first guess for the polar coordinates $(\theta,\phi)$, but not as a final value for the polar coordinates $(\theta,\phi)$).

The second step of the best fit process of the preferred embodiment of the present invention, starts by positioning scanning probe 41 to point at the "north pole" 51' of calibration sphere 50. This positioning of scanning probe 41, is performed based on the first estimation of the polar coordinates $(\theta,\phi)$ and the value of position vector ($\vec{r}_C)_{CMM}$ resulting from the first step of the best fit process. The distance $D(n)$ and position vector $\vec{r}_{CMM}(n)$ of reference point 31" are now measured for a plurality of measuring points 51" that are preferably, but are not limited to, spaced evenly on "latitudes" of "northern hemisphere" 58a of calibration sphere 50. The best fit in the second step, is made on all five parameters which are the Cartesian components (($X_C)_{CMM}$, $(Y_C)_{CMM}$, $(Z_C)_{CMM}$) of the position vector ($\vec{r}_C)_{CMM}$ of reference point 31 corresponding to the position of calibration sphere's center point 55, and the polar coordinates $(\theta,\phi)$ of the inclination of scanning probe 41. The starting values for the best fit in the second step of the Cartesian components (($X_C)_{CMM}$, $(Y_C)_{CMM}$, $(Z_C)_{CMM}$) of position vector ($\vec{r}_C)_{CMM}$, are the values of these parameters resulting from the best fit of the first step; whereas the starting values for the best fit in the second step of the polar coordinates $(\theta,\phi)$, are still taken from the setting of probe holder 42.

This stepwise best fit calibration process of the preferred embodiment of the present invention, is repeated for each of the scanning probe configurations that participate in measuring the shape of the same workpiece. Thus, the data on the inclination of scanning probe 41, expressed in polar coordinates $(\theta,\phi)$, and the data on the position vetor ($\vec{r}_C)_{CMM}=\vec{r}_C-\vec{\Delta}$ of reference point 31 corresponding to the position of calibration sphere's center point 55, are provided for each of the scanning probe configurations. And then, by regarding one of the calibrated scanning probe configurations as a master scanning probe configuration, the data on the offset vector difference $\vec{\Delta}-\vec{\Delta}(M)$ that is required for determining the transformation into a reading of the reference point position 31 that would have been obtained by scanning with the master scanning probe configuration, is provided by the relation: $\vec{\Delta}-\vec{\Delta}(M)=(\vec{r}_C)_{CMM}(M)-(\vec{r}_C)_{CMM}$, where $\vec{\Delta}(M)$ and $(\vec{r}_C)_{CMM}(M)$ denote the offset vector $\vec{\Delta}$ and the position vector ($\vec{r}_C)_{CMM}$, respectively, for the master scanning probe configuration.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. In a shape measuring system for measuring a shape of a workpiece, the shape measuring system having a fixed coordinate frame with a fixed origin point, a method for calibrating a configuration of a scanning probe having a variable distance to the workpiece, the scanning probe being held by a scanning probe holder, the method comprising the steps of:
   (a) providing a calibration object to serve as the workpiece, said calibration object including a calibration point;
   (b) for each of a first plurality of points on a surface of said calibration object:
      (i) measuring a distance from said each point to the scanning probe; and
      (ii) measuring a position of a reference point, when the scanning probe is in a scanning position of said each point, thereby providing a first set of measured calibration data; and
   (c) performing a first simultaneous fitting of both an inclination of the scanning probe and a position of said calibration point to said first set of measured calibration data, thereby providing a first set of inferred calibration data.

2. The method of claim 1, wherein said calibration object includes a calibration sphere, with a center of said calibration sphere serving as said calibration point.

3. The method of claim 1, wherein said inclination of the scanning probe is expressed in polar coordinates relative to the fixed coordinate frame.

4. The method of claim 1, wherein said position of said reference point is expressed relative to the fixed origin point.

5. The method of claim 1, wherein said position of said calibration point is expressed relative to the fixed origin point.

6. The method of claim 1, further comprising the steps of:
   (d) using an inclination of the scanning probe holder as a first estimation of said inclination of the scanning probe for said first simultaneous fitting.

7. The method of claim 6, wherein said inclination of the scanning probe holder is expressed in polar coordinates relative to the fixed coordinate frame.

8. The method of claim 1, further comprising the steps of:
   (d) using said first set of inferred calibration data for locating each of a second plurality of points on said surface of said calibration object;
   (e) for each of said second plurality of points on said surface of said calibration object:
      (i) measuring a distance from said each point to the scanning probe, and
      (ii) measuring a position of said reference point, when the scanning probe is in a scanning position of said each point, thereby providing a second set of measured calibration data; and
   (f) performing a second simultaneous fitting of both said inclination of the scanning probe and said position of said calibration point to said second set of measured calibration data, thereby providing a second set of inferred calibration data, wherein said first set of inferred calibration data is used as a first estimation of both said inclination of the scanning probe and said position of said calibration point.

9. In a shape measuring system for measuring a shape of a workpiece, a method for calibrating a plurality of configurations of at least one scanning probe having a variable distance to the workpiece, each at least one scanning probe having an offset from a reference point in each respective configuration thereof, the method comprising the steps of:
   (a) providing a calibration object including a calibration point;
   (b) calibrating each configuration separately, to provide a set of inferred calibration data for said each configuration including an inclination of a respective scanning probe of said each configuration and a position of said calibration point;
   (c) designating one of the plurality of configurations as a master configuration; and
   (d) calculating, for each configuration other than said master configuration, a difference between said offset of said respective scanning probe of said each configuration other than said master configuration, and said offset of said respective scanning probe of said master configuration.

10. The method of claim 9, wherein said separate calibrating includes the steps of, for said each configuration:
    (i) for each of a plurality of points on a surface of said calibration object:
       (A) measuring a distance from said each point to said respective scanning probe of said each configuration; and
       (B) measuring a position of said reference point, when said respective scanning probe of said each configuration is in a scanning position of said each point, thereby providing a set of measured calibration data for said each configuration; and
    (ii) simultaneously fitting both said inclination of said respective scanning probe of said each configuration and said position of said calibration point to said set of measured calibration data for said each configuration, thereby providing said set of inferred calibration data for said each configuration.

11. A method for measuring a shape of a workpiece using a configuration of a scanning probe having a variable distance to the workpiece, the method comprising the steps of:
    (a) providing a calibration object including a calibration point;
    (b) calibrating the configuration to provide a set of inferred calibration data including an inclination of the scanning probe and a position of said calibration point;
    (c) for each of a plurality of points on a surface of the workpiece:
       (i) measuring a distance from said each point to the scanning probe; and
       (ii) measuring a position of a reference point, when the scanning probe is in a scanning position of said each point, thereby providing a set of measured data for said each point;
    (d) calculating coordinates for each of said plurality of points, using said set of measured data for said each point and said set of inferred calibration data; and
    (e) determining the shape of the workpiece, using said coordinates of said plurality of points.

12. The method of claim 11, wherein said calibrating includes the steps of:
    (i) for each of a plurality of points on a surface of said calibration object:
       (A) measuring a distance from said each point to the scanning probe; and
       (B) measuring a position of a reference point, when the scanning probe is in a scanning position of said each point,
       thereby providing a set of measured calibration data; and
    (ii) simultaneously fitting both said inclination of the scanning probe and said position of said calibration point to said set of measured calibration data, thereby providing said set of inferred calibration data.

13. A method for measuring a shape of a workpiece using at least one of a plurality of configurations of at least one scanning probe having a variable distance to the workpiece, each at least one scanning probe having an offset from a reference point in each respective configuration thereof, the method comprising the steps of:
    (a) providing a calibration object including a calibration point;
    (b) calibrating each configuration separately, to provide a set of inferred calibration data for said each configuration including an inclination of a respective scanning probe of said each configuration and a position of said calibration point;
    (c) designating one of the plurality of configurations as a master configuration;
    (d) calculating for each of the configurations other than said master configuration, a difference between said offset of said respective scanning probe of said each configuration other than said master configuration, and said offset of said respective scanning probe of said master configuration, thereby providing an offset difference for said each configuration other than said master configuration;
    (e) for each of a plurality of points on a surface of the workpiece, scanning said each point using a respective one of said at least one scanning probe in a respective configuration thereof, thereby measuring, for said each point:

(i) a distance from said each point to said respective scanning probe; and (ii) a position of the reference point, when said respective scanning probe is in a scanning position of said each point, thereby providing a set of measured data for said each point;

(f) calculating coordinates for each of said plurality of points, using both said set of measured data for said each point, and said set of inferred calibration data for said respective configuration of said each point, said calculating also using said offset difference of said respective configuration of said each point, if said respective configuration of said each point is a configuration other than said master configuration; and (g) determining the shape of the workpiece, using said coordinates of said plurality of points.

14. The method of claim 13, wherein said separate calibrating includes the steps of, for said each configuration:

(i) for each of a plurality of points on a surface of said calibration object:

(A) measuring a distance from said each point to said respective scanning probe of said each configuration; and (B) measuring a position of said reference point, when said respective scanning probe of said each configuration is in a scanning position of said each point, thereby providing a set of measured calibration data for said each configuration; and (ii) simultaneously fitting both said inclination of said respective scanning probe of said each configuration and said position of said calibration point to said set of measured calibration data for said each configuration, thereby providing said set of inferred calibration data for said each configuration.

* * * * *

UNITED STATES PATENT AND TRADEMARK OFFICE
CERTIFICATE OF CORRECTION

PATENT NO.   : 6,199,024 B1
DATED        : March 6, 2001
INVENTOR(S)  : David Bunimovich et al.

It is certified that error appears in the above-identified patent and that said Letters Patent is hereby corrected as shown below:

<u>Title page,</u>
Item [73], please correct Assignee as follows:
-- Assignee: Nextec, Ltd., Haifa, Israel --

Signed and Sealed this

Twenty-eighth Day of May, 2002

Attest:

Attesting Officer

JAMES E. ROGAN
*Director of the United States Patent and Trademark Office*